United States Patent [19]

Miwa et al.

[11] Patent Number: 4,983,715

[45] Date of Patent: Jan. 8, 1991

[54] CURABLE COMPOSITION

[75] Inventors: Hiroshi Miwa, Itami; Yoshitaka Okude, Hirakata; Katsumi Mizuguchi, Suita; Hidefumi Okuda, Toyonaka, all of Japan

[73] Assignee: Nippon Paint Co., Ltd., Osaka, Japan

[21] Appl. No.: 334,549

[22] Filed: Apr. 7, 1989

[30] Foreign Application Priority Data

Apr. 8, 1988 [JP] Japan .................................. 63-87557
May 12, 1988 [JP] Japan .................................. 63-117775

[51] Int. Cl.$^5$ .............................................. C08G 63/02
[52] U.S. Cl. ...................................... 528/272; 528/274; 528/279; 528/280; 528/282; 528/288; 528/291; 528/332; 528/351; 528/353
[58] Field of Search ................ 528/272, 274, 279, 280, 528/282, 288, 291, 332, 351, 353

[56] References Cited

U.S. PATENT DOCUMENTS 4,260,735 7/1981 Bander et al. ...................... 528/279
4,284,461 8/1981 St. Clair et al. .................. 156/331.5

FOREIGN PATENT DOCUMENTS 0140423 8/1985 European Pat. Off. .
0274110 7/1988 European Pat. Off. .

OTHER PUBLICATIONS

Patent Abstracts of Japan, vol. 12, No. 263 (C-514)[3110], 22nd Jul. 1988; & JP-A-63 46 267 (Nippon Paint Co., Ltd.) 27-02-1988.

*Primary Examiner*—John Kight, III
*Assistant Examiner*—Sam A. Acquah
*Attorney, Agent, or Firm*—Wenderoth, Lind & Ponack

[57] ABSTRACT

The present invention provides a curable composition which is cured at a relatively low temperature and, when cured, exhibits excellent physical properties. The curable composition comprises;

(A) a compound having a carboxylic anhydride group,
(B) a polyfunctional amine compound, a polyfunctional hydroxyl group-containing compound, a compound having both an amino group and a hydroxyl group or a compound latently having an amino group and/or a hydroxyl group, and
(C) a polyhydric metal chelate compound or a polyhydric metal alcoholate compound.

13 Claims, No Drawings

CURABLE COMPOSITION

FIELD OF THE INVENTION

The present invention relates to a curable composition. More particularly, it relates to a curable composition suitable for coating and molding applications.

BACKGROUND OF THE INVENTION

Curable compositions containing metal chelate compounds, especially for coating applications, are known to the art.

Japanese Kokai Publication (unexamined) 2798/1975 discloses a curable epoxy resin composition which comprises a reaction product of an epoxy resin with a metal chelate compound of beta-diketone. The composition, however, is poor in reactivity and therefore needs to cure at 90° C for 16 hours and then 130° C. for 24 hours. It provides a cured article having poor physical properties, when cured at a low temperature for a short period of time.

Japanese Kokai Publication (unexamined) 100869/1981 discloses one-package ambient temperature curing coating composition which contains acrylic copolymer or alkyd resin, aluminum alcoholate, keto-enol tautomeric compound, a solvent and a small amount of a metal hydroxide. The composition, however, provides a cured article having poor solvent resistance, when cured at a low temperature and for a short period of time.

In order to improve curing properties at a low temperature, the present inventors proposed in U.S. patent application Ser. No. 145,628 filed on Jan. 15, 1988 a composition which comprises a hydroxyl group containing compound, a compound having an acid anhydride group and a metal chelate compound. The present inventors have studied more to improve the proposed composition.

SUMMARY OF THE INVENTION

The present invention provides a curable composition which is cured at a relatively low temperature and, when cured, exhibits excellent physical properties. The curable composition of the present invention comprises:

(A) a compound having a carboxylic anhydride group, (B) a polyfunctional amine compound, a polyfuncational hydroxyl group-containing compound, a compound having both an amino group and a hydroxyl group or a compound latently having an amino group and/or a hydroxyl group, and (C) a metal chelate compound or a metal alcoholate compound.

DETAILED DESCRIPTION OF THE INVENTION

Component (A)

The compound having an carboxylic anhydride group (A) employed in the present invention is one known to the art, for example, a low molecular weight acid anhydride, such as maleic anhydride, phthalic achydride, hydrogenated phthalic anhydride, 4-methylhydrogenated phthalic anhydride, pyromellitic anhydride, pyromellitic anhydride triglyceride, pyromellitic anhydride ethyleneglycol ester and a mixture thereof; a polymeric acid anhydride, such as a copolymer of an ethylenic acid anhydride (such as itaconic anhydride and maleic anhydride) and an alpha, beta-ethylenic monomer; and the like. The acid value of the polymeric acid anhydride is within the range of 30 to 500, preferably 50 to 350. If the compound having an anhydride group (A) (hereinafter referred to as "acid anhydride") is classified primary, secondary and tertiary in connection with the anhydride group, then a secondary or tertiary acid anhydride is preferred for obtaining high crosslinking degree. Preferred is pyromellitic anhydride triglyceride, pyromellitic anhydride ethyleneglycol ester, and a hydrogenated one thereof, or the polymeric acid anhydride.

Component (B)

The polyfunctional amine compound in the component (B) of the present invention includes an aliphatic amine such as ethylenediamine, trimethylenediamine, tetramethylenediamine, hexamethylenediamine, nonamethylenediamine, diethylenetrimamine and the like; an alicyclic amine, such as isophoronediamine, 4,4'-diaminodicyclohexylmethane, 4,4-diaminodicyclohexylpropane, hydrogenated xylenediamine, dipentenediamine, diaminomenthene and the like; a diamine of which an amino group is not directly bonded to an aromatic ring, such as α, α, α', α'-tetramethylxylylenediamine, xylylenediamine; a secondary diamine represented by the following formula;

wherein $R_5$ and $R_6$, which are the same or different, represent methyl, ethyl, n-propyl, i-propyl, n-butyl, secbutyl, i-butyl, cyclopentyl, cyclohexyl, cyanoethyl and the like, and A represents an alkylene, a cycloalkylene, an aryl residue, a polyether residue and the like; a cyclic diamine represented by the following formula;

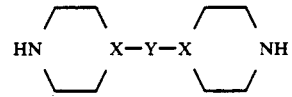

where Y represents an alkylene, a cycloalkylene, an aryl residue, a polyether residue and the like, X is CH or N, provided that when X is CH, A can be eliminated; and the like.

The polyfunctional hydroxyl group-containing compound can have a high molecular weight or a low molecular weight, Examples of the compounds are low molecular weight polyols, polyester resins, polyacryl resins, silicone resins, polybutadienes and a mixture thereof. Typical examples of the low molecular weight polyols are diols, such as ethylene glycol, propylene glycol, 1,6-hexane diol, diethylene glycol, 1,5-pentane diol and the like; and higher polyols, such as neopentyl glycol, glyceride, trimethylolpropane and the like. Typical examples of the polyester resins are oil-free alkyd, long oil alkyd, short oil alkyd, ultra long oil alkyd and middle oil alkyd. Typical examples of the acryl resins are acryl polyol, styrene containing-acryl polyol, CAB modified acryl polyol, NC modified acryl polyol, oil free alkyd modified-acryl polyol and the like. Typical examples of the silicone resins are silanol terminated methylsilicone, silanol terminated alkylsilicone, silanol terminated phenylsilicone, silanol terminated methylphenylsilicone and the like. Typical examples of the butadiene resins are hydroxyl group terminated polybutadiene and the like. Preferably, the polymer has primary hydroxyl groups, especially terminal hydroxyl groups. Secondary or tertiary hydroxyl groups may be present, but they are not preferred due to steric hindrance. The hydroxyl group-containing compound may have other functional groups, for example, tertiary amino groups, and the like. Among them, triethanolamine and tripropanolamine are preferred, because the tertiary amino group accelerates curing reactions.

The component (B) can be a compound having both an amino group and a hydroxyl group. Examples of such compounds are alkanolamine, such as ethanolamine, diethanolamine, propanolamine, dipropanolamine, N-methylethanolamine and the like; a reaction product of a primary amine(such as ethylenediamine, hexamethylenediamine and the like) with an epoxy compound (such as ethylene oxide, propylene oxide and the like); and the like.

The amino or hydroxyl group in the above mentioned component (B) may be blocked with a suitable blocking agent, if necessary. The blocked compound has latent functional group and releases the block at the time of reaction. A blocked amine compound may be prepared by reacting the above mentioned amine compound with a ketone, an aldehyde and the like. A blocked hydroxyl group compound may be prepared by reacting the above mentioned hydroxyl group containing compound with trimethylsilyl chloride, hexamethyl disilazane, N-O-bistrimethylsilyl acetamide, bistrimethylsilylurea, N-trimethylsilyl-N,N'-diphenylurea, trimethylsilylimidazole and the like. The hydroxyl group containing compound may be blocked with dihydropyrane or 5,6-dihydro-4-methoxy-2Hpyrane to form a tetrahydropyranyl group. It may also be blocked with a reaction product of tetrahydrofuran with thionyl chloride to form a tetrahydrofuranyl group. Blocking methods are described detailed in Protective Groups in Organic Synthesis, by T. W. Greene (1981), Wileye-Interscience publication). the blocking agents are also known to the art. The curable composition of the present invention is generally served with two packages, but can make one package when the blocked compound is employed.

An equivalent ratio of the amino or hydroxyl group n the component (B) and the carboxylic anhydride group in the component (A) is 0.2 to 3, preferably 0.6 to 2 by a ratio of carboxylic anhydride/amino or hydroxyl group. If the ratio is less than 0.2, crosslink density and solvent resistance are poor. If it is more than 3, weather resistance is deteriorated.

Component (C)

The metal chelate compound or a metal alcoholate compound (B) of the present invention includes an aluminum compound, such as aluminum tris(ethylacetoacetate), aluminum tris (acetylacetonate), aluminum-di-n-butoxidemonoethylacetoacetate, aluminum-di-n-butoxidemonomethylacetoacetate, aluminum-diisobutoxidemonomethylacetoacetate and the like; a titanium compound, such as di-isopropoxy-bis(acetylacetone) titanate, di-n-butoxy-bis(triethanolamine) titanate, dihydroxy-bis(lactic acid) titanate, tetraoctylene glycol titanate and the like; zirconium compound, such as zirconium tetra(acetylacetonate), zirconium acetate, zirconium laurate and the like; a cobalt compound, such as cobalt bis(acetylacetonate), cobalt oxalate and the like; a zinc compound, such as zinc salicylate, zinc benzoate, zinc oleate, zinc stearate and the like; a nickel compound, such as nickel bisacetylacetonate, nickel dimethylglyoxime, nickel oxalate and the like; and a mixture thereof. Preferred are the aluminum or zirconium compound because they are substantially no color.

It is more preferred that a ligand for forming a metal chelate is specific one which has a coordinating group and a reactive group. The metal chelate having the specific ligand, when cured, is incorporated into a matrix through the reactive group and does not leave from the the matrix, thus preventing shrinkage of a cured film. The ligand of the metal chelate is a compound having a coordinating group of the formula;

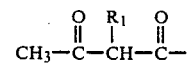

(wherein $R_1$ represents a hydrogen atom or an alkyl group having 1 to 3 carbon atoms), and a reactive group of the formula;

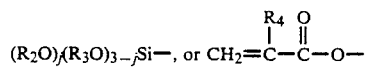

(wherein $R_2$ and $R_3$ respectively represent an alkyl group having 1 to 3 carbon atoms, $R_4$ represents a hydrogen atom or a methyl group and j represents an integer of 1 to 3). One example of the ligand is a compound (I) having the following formula;

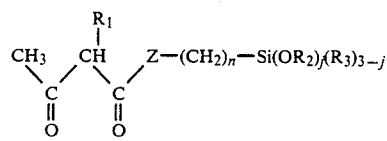

wherein $R_1$, $R_2$, $R_3$ and j are the same as mentioned above, Z represents —O—, —S—and —$NR_7$—in which $R_7$ is a hydrogen atom, and alkyl group having 1 to 3 carbon atoms or a phenyl group, and n is an integer of 1 to 3. The compound (I) may be prepared by reacting a diketene with a silicon compound having both an amino group (including an imino group), an alcohol group or a thiol group, and a hydrolyzable group. Examples of the silicon compounds are those having an amino or imino group, such as gamma-amimopropyltrimethoxysilane, gamma-aminopropyltriethoxysilane, gamma-aminopropyltripropoxysilane, N-phenyl-gamma-aminopropyltriethoxysilane and N-phenyl-gamma-aminopropyltripropoxysilane and the like; those having an alcohol group, such as allyl alcohol, 3butene-1-ol, 3-butene-2-ol, 4-pentene-1-ol, 4-pentene-2-ol; those having a thiol group, such as gamma-mercaptopropyltrimethoxysilane, gamma-mercaptopropyltriethoxysilane, gamma-mercaptopropyltripropoxysilane and the like. the reaction may generally be carried out at a temperature of 0 to 100 °C., preferably 40° to 80° C., in an organic solvent. Examples of the organic solvents are halogenated alkyls, such as chloroform, methylene chloride, dichloroethane and the like; cyclic ethers, such as tetrahydrofuran, dioxane and the like; esters, such as ethyl acetate, butyl acetate and the like; aromatic compounds, such as benzene, xylene and the like. The compound (I) may also be prepared by reacting an alpha, gamma-diketo compound having a carbon-carbon double bond with a silylhydridte compound by a method as described in J, Amer. Chem. Soc. 82, 3601 (1960).

another example of the ligand is a compound (II) having the following formula;

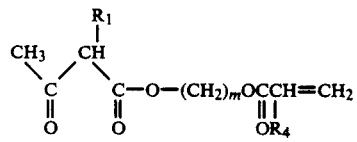

wherein $R_1$ and $R_4$ are the same as mentioned above, m is an integer of 2 to 6. The compound (II) may be prepared by reacting a diketene with a hydroxyalkyl (meth) acrylate. Examples of the hydroxyalkyl (meth)acrylates are 2-hydroxy(meth)acrylate, 3-hydroxy(meth)acrylate, 4-hydroxy(meth)acrylate, 6-hydroxy(meth)acrylate and the like. The reaction can be carried out at a temperature of 60° to 80° C. for 0.5 to 5 hours.

A method of forming a chelate compound from the specific ligand is known, including a method using a metal alcoxide, a ligand-exchanging method using another metal chelate, a method using a metal chloride (Rocz. Chem., 44, 1363 (1970)), a method using a metal oxide (indian JJ. Chem., 4, 451, (1966)) and a method directly synthesizing from a metal (Nippon Kagaku Zassi, 84, 890 (1966)) and the like. The formulation of the chelate compound of the present invention can be identified by existence of absorption which is formed by chelate formation.

An amount of the metal chelate compound or a metal alcoholate compound (C) is 0.3 to 3.0 equivalent, preferably 0.5 to 1.5 equivalent in terms of metal, based on one equivalent of the carboxylic anhydride group of the component (A). By "metal equivalent" is meant a quotient of the atomic weight of a metal divided by the valence number of the metal. If the equivalent is less than 0.3, weather resistance is poor. If the equivalent is more than 3, unreacted chelate or alcoholate remains and weather resistance is poor.

The curable composition of the present invention contains the above mentioned three components (A), (B) and (C) and is very suitable for molding and coating. Coating applications are very preferred, because the composition is curable at a relatively low temperature.

In case of the coating applications, the curable composition of the present invention may be made a clear paint or be mixed with a pigment to form an enamel paint. The pigment can be any conventional one, for example, iron oxide, lead oxide, strontium chromate, carbon black, coal dust, titanium oxide, talc , barium sulfate, cadmium yellow, cadmium red, chromium yellow, a metal pigment (such as aluminum flake), an organic pigment (such as quinacridone, copper phthalacyanine, benzimidazoline) and the like. The pigment content in the paint is usually expressed as a weight ratio of pigment/nonvolatile content of the coating composition. In one embodiment of the present invention, the weight ratio can be as high as 1:1, typically is between 0.05 to 1:1.

The coating composition of the curable composition may generally contain a liquid diluent. The liquid diluent is a solvent or nonsolvent which is removed after applying and which reduces the viscosity so that it is coated in a controlled thickness by a general coating method, such as spray coating and the like. The liquid diluent also assists wetting properties of a substate, miscibility, package stability, coalescent properties and film-forming properties. Suitable examples of the diluents are an aromatic hydrocarbon, such as toluene and xylene; a ketone, such as methyl ethyl ketone and methyl isobutyl ketone; and secondary or terteriary alcohol, such as isopropyl alcohol and sec-butyl alcohol; a monoether of glycol, such as ehtyleneglycol monoether and diethyleneglycol monoether; a monoether glycol acetate, such as 2-ethoxyethyl acetate; and a suitable mixture thereof, the diluent may be present in the coating composition in an amount of up to 60% by weight, generally 20 to 55% by weight based on the total amount of the diluent and the nonvolatile content of the coating composition.

Beside the above components, an additive, such as filler, a plasticizer, an antioxidation agent, a ultraviolet absorber, a flow controlling agent, a surfactant and the like can be added, if desirable. An amount of the additive is varied widely, generally up to 10% by weight based on the nonvolatile content of the coating composition.

The coating composition may be applied on a substrate by spray coating, blushing dipping, roll coating, flow coating and the like. The substrate to be employed includes wood, metal, glass, fabric, plastics, foam or various primer-coated substrate. The coating composition is very suitable for plastics or metal, such as steel and aluminum. A thickness of film can be varied, but generally is 0.5 to 3 mil. After the coating composition has been applied, it is cured. Curing can be carried out various temperature including ambient temperature, at a low temperature, especially 50° to 150° C., preferably 60° to 100° C. to obtain a highly crosslinked film. The time for curing is varied by the curing temperature, but is generally at 60° C. to 100° C. for 10° to 30° minutes.

the curable composition of the present invention can be cured in the presence of water and therefore stored for a long period of time in the substantial absence of water, especially moisture.

The curable composition of the present invention can be cured at a relatively low temperature, i.e. at room temperature to 120° C. The cured article has excellent weather resistance and water resistance, because free carboxylic groups in the cured article are capped or obstructed. If the specific ligand (I) or (II) having a reactive group is employed, then it is incorporated into a cured matrix and reduces shrinkage. When the composition is used as a coating composition, it provides excellent cured film having a high hardness and solvent resistance.

The coating composition may be one packed according to the reactivity of the components (A), (B) and (C), if possible, and generally be two packed.

EXAMPLES

The present invention is illustrated by the following examples, which, however, are not to be construed as limiting the present invention to their details. All parts and percentage in the examples are by weight unless otherwise specified.

PRODUCTION EXAMPLE 1

Synthesys of polymer I containing a carboxyl anhydride group.

A one liter reaction vessel equipped with a thermometer, an agitator, a condenser and a nitrogen inlet was charged with 120 parts of butyl acetate and heated to 100° C. A solution containing 21 parts of n-butyl acrylate, 95 parts of n-butyl methacrylate, 34 parts of 2-ethylhexyl methacrylate, 45 parts of itaconic anhydride, 60 parts of dioxane and 10 parts of t-butylperoxy hexanoate was added dropwise over 3 hours and further mixed for 2 hours to obtain an acryl resin having a nonvolatile content of 53% and a number average molecular weight of 5,500.

PRODUCTION EXAMPLE 2 TO 5

Synthesys of polymers II to V containing a carboxyl anhydride group

Polymer containing a carboxyl anhydride group were obtained as generally described in Production Example 1 but using the components shown in Table 1.

TABLE 1

| Production examples number | 2 | 3 | 4 | 5 |
|---|---|---|---|---|
| Butyl acetate | 100 | 120 | 100 | 100 |
| Xylene | 20 | — | 20 | — |
| Butylene | 10 | — | 50 | — |
| Methyl methacrylate | — | 30 | 35 | — |
| Butyl acrylate | 80 | 30 | 30 | 8 |
| 2-Ethylhexyl methacrylate | 45 | 60 | 15 | 45 |
| Ethyl methacrylate | 15 | — | — | — |
| Ethyl acrylate | — | 45 | 25 | 15 |
| Itaconic anhydride | 45 | 30 | 40 | 55 |
| Dioxane | 50 | 50 | 50 | 70 |
| Kayer-0* | 7 | 10 | — | — |
| AIBN** | — | — | 8 | 2 |
| Nonvolatile content | 52 | 53 | 52 | 52 |
| Number-average molecular weight | 7,000 | 5,000 | 4,000 | 12,000 |

*Kayer-0; t-Buthyl-peroxy-2-ethyl hexanoate
**AIBN; azobisisobutyronitrile

PRODUCTION EXAMPLE 6

Preparation of Compound B-I having a ketimine group

A reaction vessel equipped with a stirrer, a condenser and a thermometer was charged with 60 parts of ethylenediamine, 30 parts of cyclohexanone and 150 parts of toluene, and reacted for 8 hours by heating to reflux with removing water. The reaction solution was condensed under a reduced pressure to form a 50 % solution.

PRODUCTION EXAMPLE 7 TO 10

Preparation of Compound B-II to B-V having a ketimine group

As generally described in Production Example 6, the ingredients in Table 2 were reacted and, after filtering it, formed to a 50% solution.

TABLE 2

| Production examples number | 7 | 8 | 9 | 10 |
|---|---|---|---|---|
| 4,4'-Diaminocyclohexyl-methane | 210 | — | — | — |
| Hexamethylendiamine | — | 116 | 116 | 116 |
| Methyl isobutyl ketone | 350 | 280 | — | — |
| Diisobutyl ketone | — | — | 500 | — |
| Isophorone | — | — | 500 | — |
| p-Toluenesulfonic acid | 1.0 | 0.8 | 1.2 | — |
| Toluene | — | — | 800 | — |
| Benzene | 800 | 500 | — | 800 |
| Ketimine compound | B-II | B-III | B-IV | B-V |

PRODUCTION EXAMPLE 11

Preparation of Compound B-VI having a ketimine group

A same reaction vessel as Production Example 6 was charged with 103 parts of diethylenetriamine, 210 parts of methyl isobutyl ketone, 1.0 parts of p-toluenesulfonic acid and 400 parts of benzene and reacted for 5 hours by heating to reflux with removing water. To the reaction solution, 155 parts of isocayante ethylethacrylate and 200 parts of benzene were added dropwise at 20° C. and reacted for 3 hours. The obtained solution was condensed under a reduced pressure to form a 50% solution of a monomer having a ketimine group.

A reaction vessel equipped with a thickmometer, a stirrer, a condenser and a nitrogen introducing inlet was charged with 120 parts of butyl acetate and heated to 120° C. At this temperature, 40 parts of n-butyl acrylate, 20 parts of styrene, 30 parts of 2-ethylhexyl methacrylate, 30 parts of the 50% solution of the monomer having a ketimine group and 4.0 parts of peroxy-2-ethyl hexanate were added dropwise over 3 hours and then mixed for 2 hours to obtain Compound B-VI having a nonvolatile content of 45% and a number average molecular weight of 4,000.

PRODUCTION EXAMPLE 12 to 15

Preparation of Compound B-VIII to B-X having an aldimine group.

A same reaction vessel as Production Example 6 was employed and the ingredients of Table 3 were charged and reacted for 5 hours by heating to reflux with removing water. The reaction solution was condensed under a reduced pressure to form a 50° % solution of compound having an aldimine group.

TABLE 3

| Production examples number | 12 | 13 | 14 | 15 |
|---|---|---|---|---|
| Hexamethylenediamine | 116 | — | — | 116 |
| Tri(methylamino)hexane | — | 173 | — | — |
| Tetramethylenediamine | — | — | 88 | — |
| Benzaldehyde | 260 | — | — | — |
| Furfural | — | 230 | — | — |
| Heptanal | — | — | 260 | — |
| Crotonaldehyde | — | — | — | 185 |
| Benzene | 450 | — | 500 | 500 |
| Toluene | — | 500 | — | — |
| Aldimine compound | B-VII | B-VIII | B-IX | B-X |

PRODUCTION EXAMPLE 16 and 17

Preparation of Compound B-VII to B-X having an enamine group

A same reaction vessel as Production Example 6 was employed and the ingredients of Table 4 were charged and reacted for 8 hours by heating to reflux with removing water. The reaction solution was condensed under a reduced pressure to form a 50% solution of Compound having an aldimine group.

TABLE 4

| Production Example number | 16 | 17 |
|---|---|---|
| Piperadine anhydride | 86 | — |
| 4,4'-Dipipedinpropane | — | 210 |
| Cyclohexane | 230 | — |

TABLE 4-continued

| Production Example number | 16 | 17 |
|---|---|---|
| Isobutylaldehyde | — | 300 |
| Benzene | 500 | 500 |
| p-Toluenesulfonic acid | 1.0 | — |
| Enamine compound | B-XI | B-XII |

PRODUCTION EXAMPLE 18 AND 19

Preparation of Compound B-XIII and B-XIV having an Oxazolidine group.

A same reaction vessel as Production Example 6 was employed and the ingredients of Table 5 were charged and reacted for 5 by heating to reflux with removing water. The reaction solution was condensed under a reduced pressure to form a 50% solution of Compound having an aldimine group.

TABLE 5

| Production examples number | 18 | 19 |
|---|---|---|
| Methylethanolamine | 75 | 75 |
| Benzaldehyde | 120 | — |
| Cyclohexane | — | 115 |
| Benzene | 300 | 300 |
| Oxazolidine compound | B-XIII | B-XIV |

PRODUCTION EXAMPLE 20

Preparation of compounds B-XV having an oxazolidine group

A same reaction vessel as Prodution Example 6 was charged with 116 parts of hexanmethylenediamine, 300 parts of benzene, and 150 parts of 1,2-epoxyamine and reacted for 3 hours at 30° C. To the reaction solution, 115 parts of cyclohexanone and 200 parts of benzene were added and reacted for 8 hours by heating to reflux with removing water. The obtained solution was condensed under a reduced pressure to form a 50% solution.

PRODUCTION EXAMPLE 21

Preparation of Compound B-XVI having an oxazolidine group

A same reaction vessel as Production Example 6 was charged with 105 parts of diethylenetrimaine, 100 parts of cyclohexanone and 300 parts of benzene and reacted for 5 hours by heating to reflux with removing water. To the reaction solution, 155 parts of isocyanate ethylmethacrylate, 200 parts of benzene and 0.5 parts of 4-methoxyphenol were added dropwise at 30° C. And reacted for 3 hours. The obtained solution was condensed under a reduced pressure to form a 50% solution of a monomer having an oxazolidine group.

A reaction vessel equipped with a thermometer, a stirrer, a condenser and a nitrogen introducing inlet was charged with 120 parts of butyl acetate and heated to 120° C. At this temperature, 40 parts of n-butyl acrylate, 20 parts of styrene, 36 parts of n-butyl methacrylate, 34 parts of 2-ethylhexyl methacrylate, 30 parts of styrene, 40 parts of the above obtained monomer solution and 4.0 parts of peroxy-2-ethyl hexanate were added dropwise over 3 hours and then mixed for 2 hours to obtain Compound B-VI having a nonvolatile content of 47%.

PRODUCTION EXAMPLE 22

Preparation of blocked alcohol C-I

A reaction vessel was charged with 38 parts of propylene glycol, 110 parts of triethylamine and 200 parts of tetrahydrofuran, and then 110 parts of trimethylchlorosilane was added over one hour. After removing a hydrochloric acid of triethylamine, it was condensed under a reduced pressure to form a blocked alcohol C-1.

PRODUCTION EXAMPLE 23

Preparation of blocked alcohol polymer C-II

A reaction vessel was charged with 130 parts of 2-hydroxy methacrylate, 300 parts of toluene and 0.5 parts of p-toluenesulfonic acid, and then 900 parts of dihydropyrane was added dropwise over one hour. The obtained solution was condensed under a reduced pressure to form a blocked alcohol.

A reaction vessel equipped with a thermometer, a stirrer, a condenser and a nitrogen introducing inlet was charged with 120 parts of butyl acetate and heated to 120° C. At this temperature, 36 parts of n-butyl acrylate, 30 parts of styrene, 34 parts of 2-ethylhexyl methacrylate, 20 parts of the blocked alcohol and 4.0 parts of t-butylperoxy-2ethyl hexanate were added dropwise over 3 hours and then mixed for 2 hours to obtain blocked alcohol C-II having a nonvolatile content of 50% and a number average molecular weight of 4,000.

PRODUCTION EXAMPLE 24

Synthesis of a ligand (I)

A one liter reaction vessel equipped with a thermometer, a condenser and a dropping funnel was charged with 58 parts (1 mol) of allyl alcohol, 100 parts of dioxane and 0.41 parts of sodium acetate (catalyst) under nitrogen blanket and heated to 60° C., to which 84 parts (1mol) of diketene was added dropwise for one hour. After completion of the addition, it was allowed to react for 2 hours with heating and dioxane was removed at a reduced pressure. The reaction product was further distilled to obtain 2-propenyl acetoacetate. It was identified by absorption at 1,742, 1,721 and 1,684 cm$^{-1}$ in IR spectrum.

Next, the obtained 2-propenyl acetoacetate was addition-reacted with trimethoxysilane according to a method described in J. Amer. Chem. Soc., 82, 3601(1960) to obtain gamma-trimethoxysilylpropyl acetoacetate having the following characteristics:

IR Spectrum: Absorption at 1,190, 1,080 and 820 cm$^{-1}$ which is derived from trimethoxysilane.

NMR Spectrum, Solvent; CDCl$_3$: Internal standard; TMS

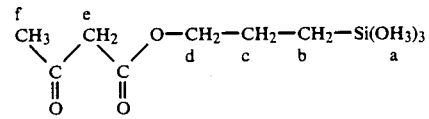

a;3.57, b; 0.68, c; 1.78, d; 4.12, e; 3.45, f; 2.27

Preparation of a metal chelate compound

A one liter reaction vessel equipped with a thermometer, a condenser and a dropping funnel was charged with 68 parts (⅓mol) of aluminum isopropoxide and 350 parts of benzene under nitrogen blanket, to which 264 parts (1 mol) of gamma-trimethoxysilylpropyl acetoacetate was added dropwise from the dropping funnel for 30 minutes. After completion of the addition, it was allowed to react for 30 minutes at 60° C. and benzene and isopropyl alcohol which was produced in the reaction were distilled away to obtain 237 parts of a chelate compound having a high viscosity. It was identified by absorption at 1,606 and 1,525 cm−1 in IR spectrum which is derived from chelate formation.

PRODUCTION EXAMPLE 25

Synthesis of a ligand (II)

A same reaction vessel as Production Example 24 was charged with 179 parts (1 mol) of gamma-aminopropyltrimethoxysilane and 200 ml of methylene chloride under nitrogen blanket and cooled in an ice bath, to which 84 parts (1 mol) of diketene was added dropwise. After completion of the addition, it was returned to room temperature and allowed to react for 30 minutes. Then, methylene chloride and unreacted material were removed at a reduced pressure. The reaction product has the following characteristics:

IR Spectrum: Absorption at 1,722, 1,650, 1,550, 1,190, 1,080 and 820 cm−1 which is derived from acetoacetamide and trimethoxysilane.

NMR Spectrum: Solvent; CDCl3: Internal standard; TMS

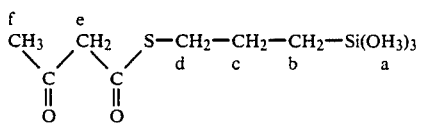

a; 3.54, b; 0.62, c; 1.63, d; 3.25, e; 3.38, f; 2.24

Preparation of a metal chelate compound

A same reaction vessel as Production Example 24 was charged with 68 parts (⅓ mol) of aluminum isopropoxide and 350 parts of benzene under nitrogen blanket, to which 88 parts (⅓ mol) of gamma-trimethoxysilypropyl acetoacetamide was added dropwise and then 67 parts (⅔ mol) of acetyl acetone was added dropwise. After completion of the addition, it was allowed to react for 30 minutes at 60° C. and benzene and isopropyl alcohol which was produced in the reaction were distilled away to obtain 164 parts of a chelate compound having a high viscosity. It was identified by absorption at 1,610 and 1,570, 1,480 and 1,420 cm−1 in IR spectrum which is derived from chelate formation.

PRODUCTION EXAMPLE 26

Synthesis of a ligand

A same reaction vessel as Production Example 24 was charged with 196 parts (1 mol) of gamma-mercaptpropyltrimethoxysilane, 200 ml of benzene and one gram of triethylamine under nitrogen blanket and heated to 60° C., to which 84 parts (1 mol) of diketene was added dropwise for one hour. After completion of the addition, it was allowed to react for 30 minutes. Then, benzene chloride and the unreacted materials were removed at a reduced pressure. The reaction product has the following characteristics:

IR Spectrum: Absorption at 1,720, 1,680, 1,560, 1,190, 1,080 and 820 cm−1 which is derived from acetylthioacetate and trimethoxysilane.

NMR Spectrum: Solvent; CDCl3: Internal standard; TMS

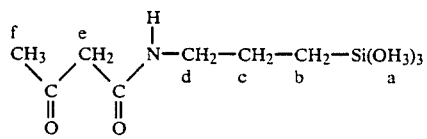

a; 3.57, b; 0.74, c; 1.73, d; 2.98, e; 3.70, f; 2.26

Preparation of a metal chelate compound

A same reaction vessel as Production Example 24 was charged with 68 parts (⅓ mol) of aluminum isopropoxide and 350 parts of benzene under nitrogen blanket, to which 178 parts (⅔ mol) of gamma-trimethoxysilylpropyl acetothioacetate was added dropwise and then 43 parts (⅓ mol) of ethyl acetoacetate was added dropwise. After completion of the addition, it was allowed to react for 30 minutes at 60° C. and benzene and isopropyl alcohol which was produced in the reaction were distilled away to obtain 239 parts of a chelate compound having a high viscosity. It was identified by absorption at 1,610 and 1,570 and 1,505 cm−1 in IR spectrum which is derived from chelate formation.

PRODUCTION EXAMPLE 27

A same reaction vessel as Production Example 24 was charged with 68 parts (⅓ mol) of aluminum isopropoxide and 200 parts of toluene, and then 214 parts of acetoacetoxyethyl methacrylate was added and reacted at 60° C. for 30 minutes. Toluene and isopropyl alcohol were distilled off to obtain 2.21 parts of a ligand compound D-IV having a high viscosity (IR absorption: 1606 cm−1 and 1525 cm−1).

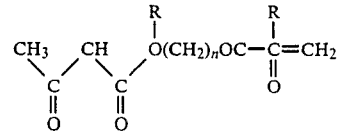

PRODUCTION EXAMPLE 28

Eighty four parts of diketene was added dropwise to solution containing 116 parts of 2-hydroxyethyl acrylate, 0.03 parts of diazabicyclooctane and 200 parts of styrene at 70° to 80° C. and mixed for one hour. The obtained solution was condensed at a reduced pressure to obtain 200 parts of acetoacetoxyethyl acrylate. The compound was reacted with 68 parts of aluminum isopropoxyde as generally described in Production Example 27 to obtain a ligand compound D-V of 209 parts (IR absorption 1606 cm−1 and 1525 cm−1 which are derived from chelating).

PRODUCTION EXAMPLE 29

As generally described in Production Example 28, 144 parts of 4-hydroxybutyl acrylate was reacted with 84 parts of diketene to obtain 228 parts of acetoacetoxybutyl acrylate. It was then reacted with 68 parts of aluminum isopropoxide to obtain a ligand compound D-VI (IR absorption: 1606 and 1525 cm−1 derived from chelating).

PRODUCTION EXAMPLE 30

Preparation of white enamel 100 parts of the polymer A-1 of Production Example 1 was reacted with 0.89 parts of dimethylethanolamine at 60°C. for 2 hours in a reaction vessel to form a varnish. Then, 100.89 parts of the varnish, 220 parts of Titan CR and 40 parts of xylene were dispersed to obtain a white paste, to which 465 parts of the polymer A-1 was added and mixed to form a white enamel.

EXAMPLE 1

A clear paint was prepared by mixing 100 parts of the polymer A-1, 25 parts of the ketimine compound B-I of Production Example 6 and 20 parts of the ligand compound of Prodution Example 28, and thinned with a thinner composed of butyl acetate/s-100. It was then spray coated on a phosphate treated steel panel which was already coated with Power Top and Orga p-2 (both available from Nippon Paint Co., Ltd.). The panel was baked at 80° C. For 30 minutes. The obtained film was evaluated and the result is shown in Table 6.

EXAMPLE 2

A treatment was carried out as generally described in Example 1, with the exception that 100 parts of the white enamel of Production Example 30 was example instead of the polymer A-1 and 20 parts of the aldimine compound B-VII of Prodution Example 12 was employed instead of the ketimine compound and 19 parts of the Production Example 29 was employed instead of the Production Example 28. The result is shown in Table 6.

EXAMPLE 3

A treatment was carried out as generally described in Example 1, with the exception that 15 parts of the enamine compound B-XI of Prodution Example 16 was employed instead of the aldimine compound of Example 2. The result is shown in Table 6.

EXAMPLE 4

A treatment was carried out as generally described in Example 1, with the exception that 28 parts of the oxazolidine compound B-XIII of Prodution Example 18 was employed instead of the aldimine compound. THe result is shown in Table 6.

EXAMPLE 5

A treatment was carried out as generally described in Example 1, with the exception that 80 parts of trimellit ethlenglycol ester was employed instead of the polymer A-1 and 500 parts of the ketimine compound B-VI of Prodution Example 11 and 25 parts of the ligand compound of Prodution Example 28 was employed instead of the ketimine compound. The result is shown in Table 6.

EXAMPLE 6

A treatment was carried out as generally described in Example 1, with the exception that 80 parts of ethyleneglycol trimellitate was employed instead of the polymer A-1 and 520 parts of the oxazolidine compound XV of Prodution Example 20 and 20 parts of the ligand compound of Prodution Example 27 was employed instead of the ketimine compound. The result is shown in Table 6.

EXAMPLE 7

A treatment was carried out as generally described in Example 1, with the exception that 80 parts of ethyleneglycol trimellitate was employed instead of the polymer A-1 and 400 parts of the blocked alcohol polymer CII of Production Example 23 and 25 parts of the ligand compound of Prodution Example 24 was employed instead of the ketimine compound. The result is shown in Table 6.

EXAMPLE 8

A treatment was carried out as generally described in Example 1, with the exception that 5.0 parts of triethanol amine and 25 parts of the ligand compound of Prodution Example 24 was employed instead of the ketimine compound. The result is shown in Table 6.

EXAMPLE 9

A treatment was carried out as generally described in Example 1, with the exception that 100 parts of the polymer A-II of Prodution Example 2 was employed instead of the polymer A-1 and 12.0 parts of the blocked alcohol C-I of Production Example 22 and 20 parts of the ligand compound of Prodution Example 25 was employed instead of the ketimine compound. The result is shown in Table 6.

EXAMPLE 10

A treatment was carried out as generally described in Example 1, with the exception that 100 parts of the polymer A-III of Prodution Example 3 was employed instead of the polymer A-1 and 5.0 parts of triethanolamine and 20 parts of the ligand compound of Prodution Example 26 was employed instead of the ketimine compound. The result is shown in Table 6.

EXAMPLE 11

A treatment was carried out as generally described in Example 1, with the exception that the polymer A-IV of Production Example 4 was employed instead of the polymer A-1 and the ligand of Production Example 27 was employed instead of the ketimine compound. The result is shown in Table 6.

EXAMPLE 12

A treatment was carried out as generally described in Example 1, with the exception that 100 parts of the polymer A-5 of Production Example 5 was employed instead of the polymer A-1 and 20 parts of the aldimine compound B-VII of Production Example 12 and 25 parts of the ligand compound of Production Example 28 was employed instead of the ketimine compound. The result is shown in Table 6.

EXAMPLE 13

A treatment was carried out as generally described in Example 1, with the exception that 100 parts of the polymer A-V of Production Example 5 was employed instead of the polymer A-1 and 22 parts of the oxazolidine compound XIII of Production Example 18 and 20 parts of the ligand compound of Production Example was employed instead of the ketimine compound and the ligand of Production Example 29 was employed. The result is shown in Table 6.

EXAMPLE 14

A treatment was carried out as generally described in Example 1, with the exception that 100 parts of the polymer A-V of Production Example 5 was employed instead of the polymer A-1 and 22 parts of the oxazolidine compound XVIII of Production Example 18 and 20 parts of the ligand compound of Production Example 24 was employed instead of the ketimine compound. The result is shown in Table 6.

mixed to form a clear paint. The same test was conducted as generally described in Example 1. The result is shown in table 8.

EXAMPLES 16 TO 34

The ingredients shown in Table 7 were employed to form a paint as the same manner of Example 15 and the same test was conducted, as generally described in Example 1 . The result is shown in Table 8.

TABLE 6

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Pencil hardness (Mitsubishi UNI) | H | F | F | F | F | H | H | F | HB | F | H | H | H | H |
| Xylene rubbing (8 double rubbings) | Good | good | good | good | good | good | good | good | good | good | good | good | good | good |
| Solvent resistance[*1] | good | good | good | good | good | good | good | good | good | good | good | good | good | good |
| Water resistance[*2] | o | o | o | o | o | o | o-Δ | o-Δ | o | o-Δ | o | o | o | o |
| Gloss (60° C.) | 98.9 | 95.3 | 96.2 | 96.7 | 95.5 | 96.0 | 98.8 | 98.5 | 95.6 | 98.6 | 97.4 | 98.1 | 98.3 | 98.9 |
| PGD value | 1.1 | 1.0 | 1.0 | 1.0 | 0.9 | 0.9 | 1.1 | 1.2 | 0.9 | 1.0 | 1.0 | 1.1 | 1.1 | 1.1 |
| Visual appearance | good | good | good | good | good | good | good | good | good | good | good | good | good | good |

[*1]Solvent resistance: The panel was dipped in gasoline and allowed to stand for 24 hours. The film was visually evaluated.
[*2]Water resistance: The panel was dipped in warm water at 50° C. and allowed to stand for 10 days. The film was visually evaluated. o — good, Δ — small number blisters.
[*3]60° Gloss: Measured by a digital geneophotometer available from Suga Test Machine Co., Ltd.
[*4]PGD Value: Portable Distinctness of image glass meter available from Tokyo Koden Co., Ltd.

EXAMPLE 15

128 Parts of the polymer A-1 of Production Example 1, 130 parts of the compound B-1 of Production Example 6, 37 parts of 50% aluminum tris(ethylacetoacetate) in toluene and 25 parts of methyl isobutyl ketone were

COMPARATIVE EXAMPLE 1

A paint was prepared as generally described in Example 15, with the exception that aluminum tris(ethylacetoacetate) was not employed. The same test was conducted and the result is shown in Table 8.

TABLE 7

| Examples number | Compound (A) (parts) | Compound (B) (parts) | Compound (C) (parts) | Additive (parts) |
|---|---|---|---|---|
| 16 | Production example 1 (128) | Production example 6 (30) | 50% Toluene solution of aluminum tris-(acetylacetate) (30) | Methyl ethyl ketone (10) |
| 17 | Production example 1 (128) | Production example 7 (50) | 50% Toluene solution of aluminum tris-(acetylacetate) (32) | Cyclohexanone (8) |
| 18 | Production example 2 (124) | Production example 8 (37) | 50% Toluene solution of aluminum tris-(acetylacetate) (30) | Cyclohexanone (8) |
| 19 | Production example 3 (125) | Production example 9 (48) | 50% Toluene solution of aluminum tris-(ethylacetoacetate) (37) | Methyl isobutyl ketone (10) |
| 20 | Production example 3 (125) | Production example 10 (47) | 50% Toluene solution of aluminum tris-(ethylacetoacetate) (35) | Methylisobutyl ketone (5) |
| 21 | Production example 4 (123) | Production example 12 (40) | 50% Toluene solution of aluminum tris-(ethylacetoacetate) (32) | Methylisobutyl ketone (8) |
| 22 | Production example 2 (124) | Production example 13 (40) | 50% Toluene solution of aluminum tris-(ethylacetoacetate) (39) | Methylisobutyl ketone (8) |
| 23 | Production example 3 (125) | Production example 14 (28) | 50% Toluene solution of aluminum tris-(ethylacetoacetate) (40) | Methyl isobutyl ketone (8) |
| 24 | Production example 1 (128) | Production example 15 (30) | 40% Toluene solution of ziroconium tetrabis (acetylacetate) (50) | Methyl isobutyl ketone (5) |
| 25 | Production example 2 (124) | Production example 16 (33) | 40% Toluene solution of ziroconium tetrabis (acetylacetate) (50) | Methyl isobutyl ketone (8) |
| 26 | Production example 3 (125) | Production example 17 (42) | 50% Toluene solution of aluminum tris-(ethylacetoacetate) (37) | Isophrone (10) |
| 27 | Production example 5 (123) | Production example 18 (30) | 50% Toluene solution of aluminum tris-(ethylacetoacetate) (37) | Isophrone (8) |
| 28 | Production example 5 (123) | Production example 19 (30) | 50% Toluene solution of aluminum tris-(ethylacetoacetate) (35) | Isophorone (8) |

TABLE 7-continued

| Examples number | Compound (A) (parts) | Compound (B) (parts) | Compound (C) (parts) | Additive (parts) |
|---|---|---|---|---|
| 29 | Production example 5 (123) | Production example 20 (56) | 50% Toluene solution of aluminum tris-(ethylacetoacetate) (39) | Isophrone (5) |
| 30 | 33% Dioxane solution of trimellitic anhydride ethylene glycol (80) | Production example 11 (500) | 30% Benzen solution of aluminum isopropoxide (22) | Acetyl acetone (5) |
| 31 | 33% Dioxane solution of trimellitic anhydride ethylene glycol (80) | Production example 21 (520) | 50% Toluene solution of aluminum tris(ethyl-acetoacetate) (37) | Acetyl acetone (3) |
| 32 | Production example 1 (128) | Production example 8 (45) | Aluminum tris(ethylace-toacetate) (30) and 30% benzene solution of aluminum isopropoxide (5) | Methyl isobutyl ketone (10) |
| 33 | Production example 1 (128) | Production example 11 (500) | 50% Toluene solution of aluminum tris(ethyl-acetoacetate) (30) | Methyl isobutyl ketone (12) |
| 34 | Production example 2 (128) | Production example 7 (50) | 50% Toluene solution of aluminum tris(ethyl-acetoacetate) (39) | Methyl isobutyl ketone (10) |

TABLE 8

| Example numbers | Pencil hardness | Xylene rubbing | Solvent resistance | Water resistance |
|---|---|---|---|---|
| 15 | H | good | good | good |
| 16 | H | good | good | good |
| 17 | H | good | good | good |
| 18 | F | good | good | good |
| 19 | H | good | good | good |
| 20 | F | good | good | good |
| 21 | H | good | good | good |
| 22 | 2H | good | good | good |
| 23 | H | good | good | good |
| 24 | H | good | good | good |
| 25 | F | good | good | good |
| 26 | F | good | good | good |
| 27 | F | good | good | good |
| 28 | H | good | good | good |
| 29 | F | good | good | good |
| 30 | H | good | good | good |
| 31 | H | good | good | good |
| 32 | H | good | good | good |
| 33 | H | good | good | good |
| 34 | H | good | good | good |
| Comparative ex. 1 | B | Decline luster | bad | Blisters |

What is claimed is:

1. A curable composition which comprises:
   (A) a compound having a carboxylic anhydride group,
   (B) a polyfuncational amine compound, a polyfunctional hydroxyl group-containing compound, a compound having both an amino group and a hydroxyl group or a compound latently having an amino group and/or a hydroxyl group, and
   (C) a metal chelate compound or metal alcoholate compound (C) being present in an amount of 0.3 to 3.0 equivalents in terms of metal based on one equivalent of said carboxylic anhydride group of the component (A).

2. The curable composition according to claim 1 wherein said compound having a carboxylic anhydride group (A) is a low molecular weight anhydride or a polymer having a carboxylic anhydride group.

3. The curable composition according to claim 2 wherein said polymer having a carboxylic anhydride group has an acid value of 30 to 500.

4. The curable composition according to claim 1 wherein said polyfunctional amine compound in the component (B) includes an aliphatic amine; an alicyclic amine; a diamine of which an amino group is not directly bonded to an aromatic ring; a secondary diamine represented by the following formula:

wherein $R_5$ and $R_6$, which are the same or different, represent an alkyl group and A represents an alkylene, a cycloalkylene, an aryl residue and a polyether residue; a cyclic diamine represented by the following formula;

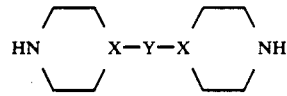

wherein Y represents an alkylene, a cycloalkylene, an aryl residue and a polyether residue, X is CH or N, provided that when X is CH, A can be eliminated.

5. The curable composition according to claim 1 wherein said polyfunctional hydroxyl group-containing compound in the component (B) can have a high molecular weight or a low molecular weight.

6. The curable composition according to claim 1 wherein said compound having both an amino group and a hydroxyl group of the component (B) is alkanolamine or a reaction product of a primary amine with an epoxy compound.

7. The curable composition according to claim 1 wherein said compound latently having an amino group and/or a hydroxyl group n the component (B) in a compound having a blocked amine group and/or a blocked hydroxy group.

8. The curable composition according to claim 7 wherein said blocked amine compound is blocked with a ketone or an aldehyde.

9. The curable composition according to claim 7 wherein said blocked hydroxyl group compound is blocked with trimethylsilyl chloride, hexamethyl disilazane, N-O-bistrimethylsilyl acetamide, bistrimethylsilylurea, N-trimethylsilyl-N,N'-diphenylurea, trimethylsilylimidazole, dihydropyrane or 5,6-dihydro-4-methoxy-2Hpyrane.

10. The curable composition according to claim 1 wherein said chelate or alcoholate compound (C) is selected from the group consisting of a chelate or alcoholate compound of Ti, Al, Zr, Co or Ni.

11. The curable composition according to claim 1 wherein the ligand of the chelate compound (C) is a compound having a coordinating group of the formula;

(wherein $R_1$ represents a hydrogen atom or an alkyl group having 1 to 3 carbon atoms), and a reactive group of the formula;

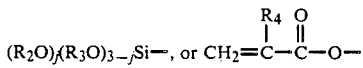

(wherein $R_2$ and $R_3$ respectively represent an alkyl group having 1 to 3 carbon atoms, $R_4$ represents a hydrogen atom or a methyl group and j represents an integer of 1 to 3).

12. The curable composition according to claim 1 being a coating composition.

13. An cured article prepared from the composition of claim 1.

* * * * *